United States Patent
Haeussler et al.

(10) Patent No.: US 9,937,921 B2
(45) Date of Patent: Apr. 10, 2018

(54) METHOD AND DEVICE FOR SWERVE ASSISTANCE FOR A MOTOR VEHICLE

(71) Applicant: Robert Bosch GmbH, Stuttgart (DE)

(72) Inventors: Thomas Haeussler, Kuenzelsau-Vogelsberg (DE); Thomas Maurer, Neuendettelsau (DE); Christian Braeuchle, Hassmersheim-Hochhausen (DE); Lutz Buerkle, Stuttgart (DE); Martin Kieren, Marbach A. N. (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/765,979

(22) PCT Filed: Dec. 11, 2013

(86) PCT No.: PCT/EP2013/076159
§ 371 (c)(1),
(2) Date: Aug. 5, 2015

(87) PCT Pub. No.: WO2014/121867
PCT Pub. Date: Aug. 14, 2014

(65) Prior Publication Data
US 2015/0367847 A1   Dec. 24, 2015

(30) Foreign Application Priority Data
Feb. 7, 2013  (DE) .................. 10 2013 202 025

(51) Int. Cl.
*H04N 21/234*   (2011.01)
*B60W 30/09*   (2012.01)
(Continued)

(52) U.S. Cl.
CPC .............. *B60W 30/09* (2013.01); *B60K 28/14* (2013.01); *B60W 10/184* (2013.01);
(Continued)

(58) Field of Classification Search
CPC ...... B60W 10/06; B60W 10/18; B60W 30/09; B60W 10/20; B60T 2260/02;
(Continued)

(56) References Cited

U.S. PATENT DOCUMENTS 5,135,070 A * 8/1992 Schwitalla ......... B60G 17/0195
                                                    137/596
5,249,157 A * 9/1993 Taylor .................. G01S 7/4811
                                                    340/435
(Continued)

FOREIGN PATENT DOCUMENTS

DE  10 2008 003 205 A1   7/2004
DE  10 2004 008 894      9/2005
(Continued)

*Primary Examiner* — Anne M Antonucci
*Assistant Examiner* — Sanjeev Malhotra
(74) *Attorney, Agent, or Firm* — Norton Rose Fulbright US LLP; Gerard Messina

(57) ABSTRACT

A method for providing swerve assistance for a motor vehicle, in which a threatening or imminent collision of the motor vehicle is detected, the driver is notified to steer the vehicle onto a collision-avoiding swerve trajectory, it is detected whether the driver heeds the warning and initiates a swerve maneuver, and if the driver initiates a swerve maneuver, a driver-independent implementation of a steering or braking intervention assisting in the steering onto the swerve trajectory takes place.

16 Claims, 1 Drawing Sheet

(51) Int. Cl.
  *B60W 50/10* (2012.01)
  *B60W 50/14* (2012.01)
  *B60W 10/20* (2006.01)
  *B60W 30/095* (2012.01)
  *B62D 15/02* (2006.01)
  *B60K 28/14* (2006.01)
  *B60W 10/184* (2012.01)

(52) U.S. Cl.
  CPC .......... *B60W 10/20* (2013.01); *B60W 30/095* (2013.01); *B60W 50/10* (2013.01); *B60W 50/14* (2013.01); *B62D 15/0265* (2013.01); *B60W 2540/18* (2013.01); *B60W 2550/10* (2013.01); *B60W 2710/18* (2013.01); *B60W 2710/20* (2013.01)

(58) Field of Classification Search
  CPC ............ B60T 2260/024; B60T 8/1755; B60T 8/1764; B62D 6/003; G08G 1/166; G08G 1/0112; G08G 1/096725; G08G 1/096791; G08G 1/168; B60Q 9/004; B60R 21/034
  USPC ...... 701/15, 23, 42, 43, 70, 71, 117; 700/94; 705/38; 340/435, 905; 455/41.2; 137/596; 303/146; 382/103
  See application file for complete search history.

(56) References Cited

U.S. PATENT DOCUMENTS

| | | | | |
|---|---|---|---|---|
| 6,114,951 A * | 9/2000 | Kinoshita | ............... | B60Q 9/008 340/435 |
| 2005/0121975 A1 * | 6/2005 | Gronau | ................ | B60T 8/1755 303/146 |
| 2005/0171654 A1 * | 8/2005 | Nichols | ................ | G08G 5/0078 701/15 |
| 2006/0100766 A1 * | 5/2006 | Schwarz | ............... | B60T 8/1755 701/71 |
| 2007/0135989 A1 * | 6/2007 | Hengst | .................. | B60W 40/04 701/117 |
| 2007/0185638 A1 * | 8/2007 | Odenthal | ............ | B60T 8/17555 701/70 |
| 2008/0040002 A1 * | 2/2008 | Galkoswki | ........... | B62D 15/025 701/43 |
| 2008/0306666 A1 * | 12/2008 | Zeng | ....................... | B60Q 9/006 701/70 |
| 2008/0312793 A1 * | 12/2008 | Schutz | .................. | B60T 8/1764 701/42 |
| 2009/0299574 A1 * | 12/2009 | Montosi | ............... | B62D 5/0472 701/42 |
| 2011/0044507 A1 * | 2/2011 | Strauss | ............... | B60R 21/0134 382/103 |
| 2012/0081219 A1 * | 4/2012 | Schiebahn | ............. | B60Q 9/004 340/435 |
| 2012/0179280 A1 * | 7/2012 | Faye | ...................... | B60Q 5/008 700/94 |
| 2013/0059540 A1 * | 3/2013 | Anschutz | ............... | H04W 8/005 455/41.2 |
| 2013/0154853 A1 * | 6/2013 | Chen | ................ | G08G 1/096716 340/905 |
| 2013/0166150 A1 * | 6/2013 | Han | ....................... | B60W 10/18 701/42 |
| 2014/0136044 A1 * | 5/2014 | Conrad | .................. | B60W 30/09 701/23 |
| 2014/0136397 A1 * | 5/2014 | Morgan | ................ | G06Q 40/025 705/38 |

FOREIGN PATENT DOCUMENTS

| | | |
|---|---|---|
| DE | 10 2008 03 205 | 7/2009 |
| DE | 10 2009 020 649 | 11/2010 |
| DE | 10 2010 001 313 | 11/2010 |
| DE | 10 2011 080 789 | 2/2012 |

* cited by examiner

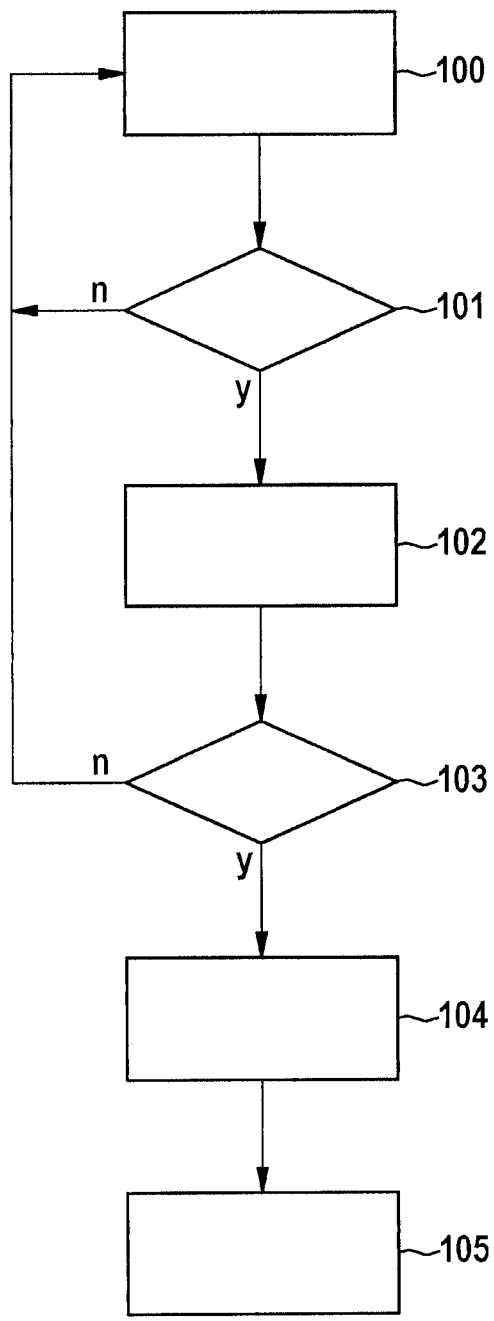

METHOD AND DEVICE FOR SWERVE ASSISTANCE FOR A MOTOR VEHICLE

FIELD OF THE INVENTION

The present invention relates to a method and device for providing swerve assistance for a motor vehicle, in which a threatening or imminent collision of the motor vehicle is detected.

BACKGROUND INFORMATION

A safety system for a manner of locomotion as well as a method that refers to such are discussed in the publication DE 10 2004 008 894 A1. In order to further develop a safety system, in particular an accident avoidance system, for a manner of locomotion having at least a steering system and at least a braking system, especially for a motor vehicle, in such a way that both in terms of the device and the method, a swerve maneuver initiated by the driver of the manner of locomotion when approaching an obstacle is supported and an accident prevented in this manner, it is proposed that: the evaluation unit ascertains at least one driving variant, especially at least one swerve trajectory and/or at least one automatic emergency braking process using the data and the information, and that during or after the initiation of a driving maneuver by the driver of the manner of locomotion, especially an emergency braking maneuver or a swerve maneuver, the safety system, especially the evaluation unit, specifies this driving maneuver in optimized form, especially in the form of an optimal swerve trajectory or an automated emergency braking operation, or assists in and/or suggests it.

SUMMARY OF THE INVENTION

The present method relates to a method for swerve assistance for a motor vehicle, in which
- a threatening or imminent collision of the motor vehicle is detected,
- the driver is notified or a swerve recommendation is output to the driver to steer the vehicle onto a collision-avoiding swerve trajectory,
- it is detected whether the driver heeds the notification or the swerve recommendation, i.e., initiates a swerve maneuver, and
- if the driver initiates a swerve maneuver, a driver-independent steering or braking intervention is implemented which assists in steering the vehicle onto the swerve trajectory.

This method according to the present invention ensures that the driver receives swerve assistance only if the driver actually heeds the information or the swerve recommendation.

One advantageous development of the present invention is characterized by the fact that once a threatening or imminent collision has been detected, a collision-avoiding swerve trajectory will be ascertained.

One advantageous development of the present invention is characterized by the fact that after the swerve trajectory has been ascertained, the detection threshold is reduced for a swerve-intent detection on the part of the driver in the direction of the swerve recommendation. This ensures that the swerve intention of the driver is recognized very rapidly, so that swerve assistance can be rendered quite quickly.

One advantageous development of the present invention is characterized by the fact that after the swerve trajectory has been ascertained, the detection threshold is raised for a swerve-intent detection on the part of the driver counter to the direction of the swerve recommendation.

One advantageous development of the present invention is characterized by the fact that the intensity of the driver-independent steering or braking intervention is a function of the time period that lies between the output of the driver notification and the initiation of the swerve maneuver by the driver. For instance, this makes it possible to take into account that in a very early driver reaction, i.e., a short time period, only slight swerve assistance will suffice.

One advantageous development of the present invention is characterized by the fact that the intensity of the driver-independent steering or braking intervention depends on whether the driver is steering in the direction of the swerve trajectory or counter to the direction of the swerve trajectory.

One advantageous development of the present invention is characterized by the fact that in the driver-independent steering intervention, an additional driver-independent steering torque is superimposed to the steering torque input by the driver.

One advantageous development of the present invention is characterized by the fact that the driver-independent steering intervention is a steering intervention at the rear axle.

One advantageous development of the present invention is characterized by the fact that the driver-independent braking intervention is a braking intervention that is asymmetrical with respect to the left and right vehicle side.

In addition, the present invention includes a device having arrangement that are configured for implementing the above method. This device in particular involves a control unit, which includes the program code for carrying out the method according to the present invention.

BRIEF DESCRIPTION OF THE DRAWING

FIG. 1 shows the sequence of one specific embodiment of the method according to the present invention.

DETAILED DESCRIPTION

The present invention can be described by the following method tasks. In particular point 3 is optional in this context and, depending on the system, is also able to be carried out at a different time.

Step 1: A looming collision is detected via methods of the environmental sensor system.

Step 2: A swerve recommendation is output to the driver. This may be done in the following manners, for instance:
- a haptic recommendation, e.g., by a steering torque,
- a visual recommendation, e.g., via a head-up display,
- an acoustic recommendation, e.g., by a warning sound;

Step 3: System parameters of the active swerve assistance are adapted. The following measures may be among them, for example:
- Reducing the detection threshold for a swerve-intention detection in the direction of the swerve recommendation;
- Increasing the detection threshold for a swerve-intention detection counter to the direction of the swerve recommendation;
- Parameterizing the assistance intensity in accordance with the duration of the recommended action until the start of the driver-initiated swerve maneuver,
- Parameterizing the assistance intensity according to the direction of the driver-initiated swerve maneuver, depending on whether the driver is steering in the recommended direction or counter to the recommended direction.

Step 4: After a swerve intention has been detected, implementing the active swerve assistance along a swerve trajectory, for instance by the following interactions:

Steering torque superimpositioning

Steering angle superimpositioning or the use of rear axle steering, for instance, An asymmetrical braking intervention to assist in the lateral control of the vehicle.

The sequence of one specific embodiment of the method according to the present invention is shown in FIG. 1. After the method is started in block 100, it is subsequently queried in block 101 whether a collision of the motor vehicle is looming or imminent. If this is not the case, then a return to block 100 takes place. If this is the case, however, the driver will then be told in block 102 to steer the vehicle onto a collision-avoiding swerve trajectory, i.e., the driver is also made aware of the looming collision. In block 103, it is then queried whether the driver initiates a swerve maneuver. If this is not the case, a return to block 100 takes place. However, if this is so, then a driver-independent braking and/or steering intervention, which supports the swerve maneuver of the driver, is started in block 104. The method according to the present invention ends in block 105.

What is claimed is:

1. A method for providing swerve assistance for a motor vehicle, the method comprising:

detecting, via a sensor system of the motor vehicle, a threatening or imminent collision of the motor vehicle;

notifying, via a processor of the motor vehicle, a driver to steer the motor vehicle onto a collision-avoiding swerve trajectory;

detecting, via the processor of the motor vehicle, whether the driver initiates a swerve maneuver to provide the collision-avoiding swerve trajectory; and implementing, via the processor of the motor vehicle, if the driver initiates the swerve maneuver, a driver-independent steering or braking intervention which assists in the guidance onto the swerve trajectory, wherein at least one of the following is satisfied: (i) an intensity of the driver-independent steering or braking intervention is a function of a time period that lies between the output of the driver notification and the initiation of the swerve maneuver on the part of the driver, and (ii) an intensity of the driver-independent steering or braking intervention depends on whether the driver steers in the direction of the swerve trajectory or counter to the direction of the swerve trajectory, and wherein after the threatening or imminent collision has been detected, the collision-avoiding swerve trajectory is ascertained.

2. The method of claim 1, further comprising:

reducing, after the collision-avoiding swerve trajectory has been ascertained, a detection threshold for detecting a swerve-intention by the driver in the direction of a swerve recommendation.

3. The method of claim 1, further comprising:

increasing, after the collision-avoiding swerve trajectory has been ascertained, a detection threshold for detecting a swerve-intention by the driver and that is counter to the direction of a swerve recommendation.

4. The method of claim 1, wherein the intensity of the driver-independent steering or braking intervention is a function of the time period that lies between the output of the driver notification and the initiation of the swerve maneuver on the part of the driver.

5. The method of claim 1, wherein the intensity of the driver-independent steering or braking intervention depends on whether the driver steers in the direction of the swerve trajectory or counter to the direction of the swerve trajectory.

6. The method of claim 1, wherein an additional driver-independent steering torque is superimposed to a steering torque input by the driver in the driver-independent steering intervention.

7. The method of claim 1, wherein the driver-independent steering intervention is a steering intervention at a rear axle.

8. The method of claim 1, wherein the driver-independent braking intervention is a braking intervention that is asymmetrical with respect to a left side and a right side of the motor vehicle.

9. A device for providing swerve assistance for a motor vehicle, comprising:

a detecting arrangement of the motor vehicle to detect a threatening or imminent collision of the motor vehicle;

a notifying arrangement of the motor vehicle to notify a driver to steer the motor vehicle onto a collision-avoiding swerve trajectory;

another detecting arrangement of the motor vehicle to detect whether the driver initiates a swerve maneuver to provide the collision-avoiding swerve trajectory; and an implementing arrangement of the motor vehicle to implement, if the driver initiates the swerve maneuver, a driver-independent steering or braking intervention which assists in the guidance onto the swerve trajectory, wherein at least one of the following is satisfied: (i) an intensity of the driver-independent steering or braking intervention is a function of a time period that lies between the output of the driver notification and the initiation of the swerve maneuver on the part of the driver, and (ii) an intensity of the driver-independent steering or braking intervention depends on whether the driver steers in the direction of the swerve trajectory or counter to the direction of the swerve trajectory, and wherein after the threatening or imminent collision has been detected, the collision-avoiding swerve trajectory is ascertained.

10. The device of claim 9, wherein after the collision-avoiding swerve trajectory has been ascertained, a detection threshold is reduced for detecting a swerve-intention by the driver in the direction of a swerve recommendation.

11. The device of claim 9, wherein after the collision-avoiding swerve trajectory has been ascertained, a detection threshold is increased for detecting a swerve-intention by the driver and that is counter to the direction of a swerve recommendation.

12. The device of claim 9, wherein the intensity of the driver-independent steering or braking intervention is a function of the time period that lies between the output of the driver notification and the initiation of the swerve maneuver on the part of the driver.

13. The device of claim 9, wherein the intensity of the driver-independent steering or braking intervention depends on whether the driver steers in the direction of the swerve trajectory or counter to the direction of the swerve trajectory.

14. The device of claim 9, wherein an additional driver-independent steering torque is superimposed to a steering torque input by the driver in the driver-independent steering intervention.

15. The device of claim 9, wherein the driver-independent steering intervention is a steering intervention at a rear axle.

16. The device of claim 9, wherein the driver-independent braking intervention is a braking intervention that is asymmetrical with respect to a left side and a right side of the motor vehicle.

* * * * *